United States Patent [19]

Paschal, Jr. et al.

[11] 3,869,581

[45] Mar. 4, 1975

[54] TELEPHONE ALLOTTER CIRCUIT FOR EQUALIZING CIRCUIT USAGE

[75] Inventors: Harold L. Paschal, Jr.; Graham T. Brown, both of Richlands, N.C.

[73] Assignees: Horace R. Mazingo, Richlands; Alex Warlick, Jr.; Carl S. Milsted, both of Jacksonville, all of, N.C. ; part interest to each

[22] Filed: Sept. 7, 1973

[21] Appl. No.: 395,360

[52] U.S. Cl. .............................. 179/18 H, 179/27 D

[51] Int. Cl. .............................................. H04m 3/22

[58] Field of Search ... 179/18 H, 27 D, 18 A, 16 H, 179/18 F, 18 G, 18 FD

*Primary Examiner*—Kathleen H. Claffy

*Assistant Examiner*—C. T. Bartz

[57] ABSTRACT

An auxiliary control system is connected to each control lead of each of the connectors in each group of connectors associated with the last or what is commonly called the fifth selector in a telephone central office. This auxiliary arrangement effectively supervises use of each of the connectors and by placing a substitute ground on each connector after its use prevents any individual connector once used from being used again until all other connectors in that group have been used.

2 Claims, 3 Drawing Figures

TELEPHONE ALLOTTER CIRCUIT FOR EQUALIZING CIRCUIT USAGE

BACKGROUND OF THE INVENTION

1. Field of the Invention

The invention relates to telephone circuits and particularly to what are called allotter circuits.

2. Description of the Prior Art

Every modern step-by-step telephone system uses a central system for selecting circuits and routing calls. Each telephone handset can receive an incoming call through any one of a group of connectors, usually ten at the maximum. The particular connector through which the handset receives a call is determined by the last and conventionally called fifth selector. The fifth selector will route the call to the first idle or non-grounded control lead which is the same as saying the first idle connector. Between the fifth selector and the connectors there is usually employed a distribution terminal assembly in which hard wire connections are made to determine the order in which the connectors appear for use to the fifth selector. This in turn determines the sequence of use of the connectors. Many practical operating problems are introduced by this practice. The first choice connector is obligated to take the incoming call if it is available and irrespective of how many times it has been used previously. This overburdens the first choice connectors and underburdens the second and subsequent choice connectors which results in unequal wear. In the event of trouble with the first choice connector, repeated attempts by incoming calls will encounter the same trouble. Thus, trouble reports become magnified very rapidly. This practice also prevents remote testing of individual connectors from a distant point. For example, if a second choice connector is actually defective, remote testing will not actually reach this connector so long as the first choice connector is available.

The most common practice to minimize wear of the first choice connector is to periodically and at great expense and time manually rewire the distribution terminal assembly so that a different first choice connector is available to the fifth selectors. Connectors can be changed from one position to another without changing the distribution terminal assembly wiring but this introduces maintenance record keeping problems since each connector's wear is associated with a particular position.

What has been needed in the telephone industry is some type of auxiliary apparatus that could be added to existing telephone selector and connector circuits and which would cause the connectors to be used on a more equal basis to circumvent the problems discussed above. Also, the industry has needed an apparatus of this kind which could be installed without disrupting present practices and at little unit expense.

SUMMARY OF THE INVENTION

According to the invention each control lead of each of the connectors in each group of connectors associated with the fifth selector is connected to the substitute grounding apparatus of the invention.

The invention constitutes what is commonly termed an allotter circuit in that a single conductor is connected to each sleeve conductor of each connector and in the embodiment used to illustrate the invention leads to a slow-to-release type sleeve relay which operates whenever the connector is seized, and readies a substitute barring potential.

The seizure and use of the connector applies a barring potential to this control lead or sleeve conductor in the conventional manner and this added sleeve relay causes certain circuit changes to take place so that upon the release of said trunk a substitute barring potential will be applied to the said sleeve conductor. This process applies to each trunk in any given series of trunks to which the invention circuitry is applied. Upon the seizure of the last available trunk in any given series of trunks which are so supervised by the invention circuitry, all previously barred trunks are released from the substitute barring potential and become available upon demand.

A feature of the invention in the illustrated embodiment is a barring relay associated with each connector. In association with the sleeve and barring relays there is a network which is responsive to the connector with which it is directly related by means of a control lead and to the busy or non-busy condition of the other connectors and which offers a locking circuit to each barring relay associated with an already used connector provided there is one or more non-busy connectors available. A non-busy connector is considered as being a connector which is void of either a normal barring potential or a substitute barring potential. Upon the release of a seized connector a substitute barring potential is forwarded to the control lead (sleeve lead) by the release of the slow-to-release sleeve relay. Upon seizure of the particular connector, the associated sleeve relay operates by means of a barring potential being forwarded over the associated control lead and is held operated by such barring potential until the connector is released. Upon release of the particular connector this barring potential is removed from the control lead which releases the associated sleeve relay. Upon release of the sleeve relay and after a time delay, due to the slow-to-release characteristic of the sleeve relay, a substitute barring potential is forwarded over the sleeve lead to mark the trunk busy.

An additional relay termed a slow-to-open (SO) holding relay is also included in the circuit. The holding relay holds the barring relay in an operated condition after the sleeve relay has operated due to a ground being furnished through the control lead. The holding relay also acts to restore all of the barring relays to a normal position after the last barring relay has operated. Each sleeve relay operates a set of normally closed contacts which are connected to prevent the holding relay from operating prematurely in an all connector busy condition. In an alternate embodiment the same function performed by such sleeve relay contacts has been performed by use of an additional relay.

DESCRIPTION OF THE PREFERRED EMBODIMENT

Figure 1:
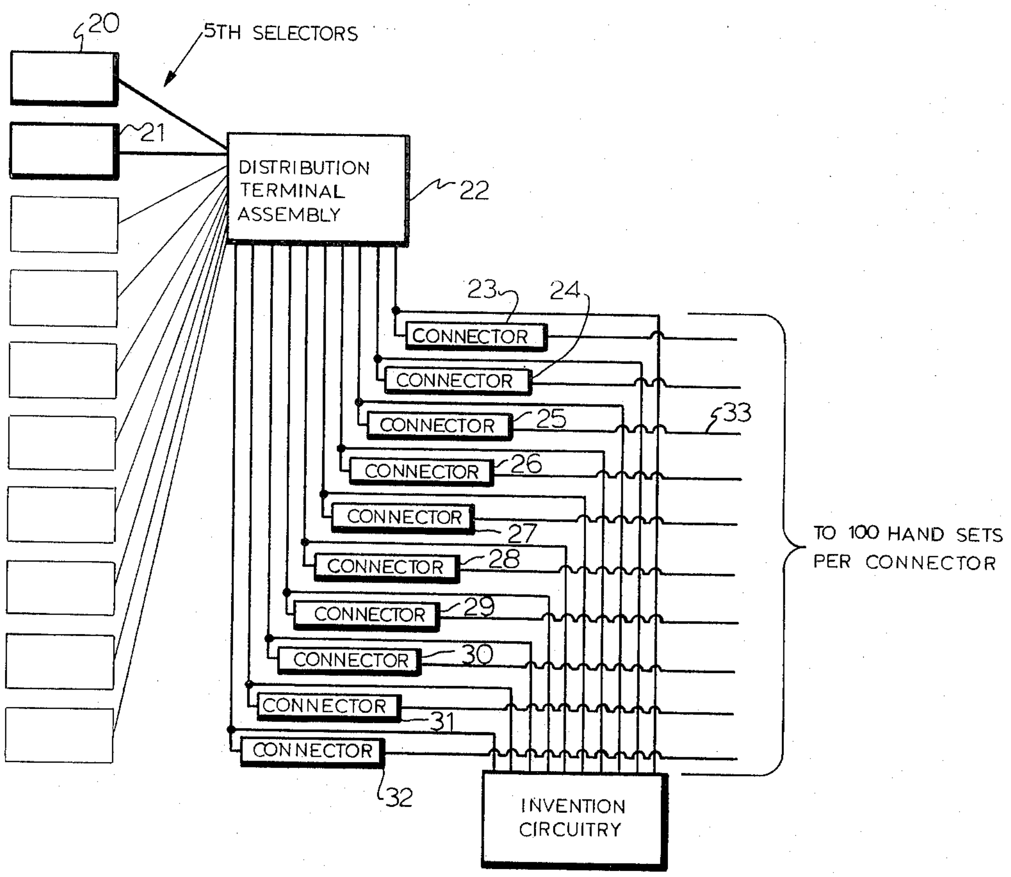
FIG. 1 is a block diagram of a portion of central station circuit and showing the invention circuit added.

In FIG. 1 there is shown that portion of the typical central station telephone circuitry which is most directly related to the invention. In this connection, the last selector is normally called a "fifth" selector, irrespective of the size of the telephone system, the two such fifth selectors 20, 21 are shown in FIG. 1. The fifth selectors eventually connect to a distribution terminal assembly (DTA) 22. Each distribution terminal assembly will connect to ten so-called "connectors" which are shown in FIG. 1 and are designated 23 through 32. Each connector will, in turn, connect to as many as one hundred hand sets. One such connection 33 is shown in FIG. 1.

The invention circuitry has a hard wire connection to each connector control lead and this connection can be made either as shown in FIG. 1 or can be made between the fifth selectors and the DTA or can be made within the DTA or wherever else such hard wire connections are accessible. Of particular interest, it should be noted that the invention circuitry requires no basic change in the conventional central station equipment and is simply connected to already existing points to perform certain functions for equalizing wear on the connectors as hereafter explained and which wear equalization functions have not been previously performed.

Figure 2:
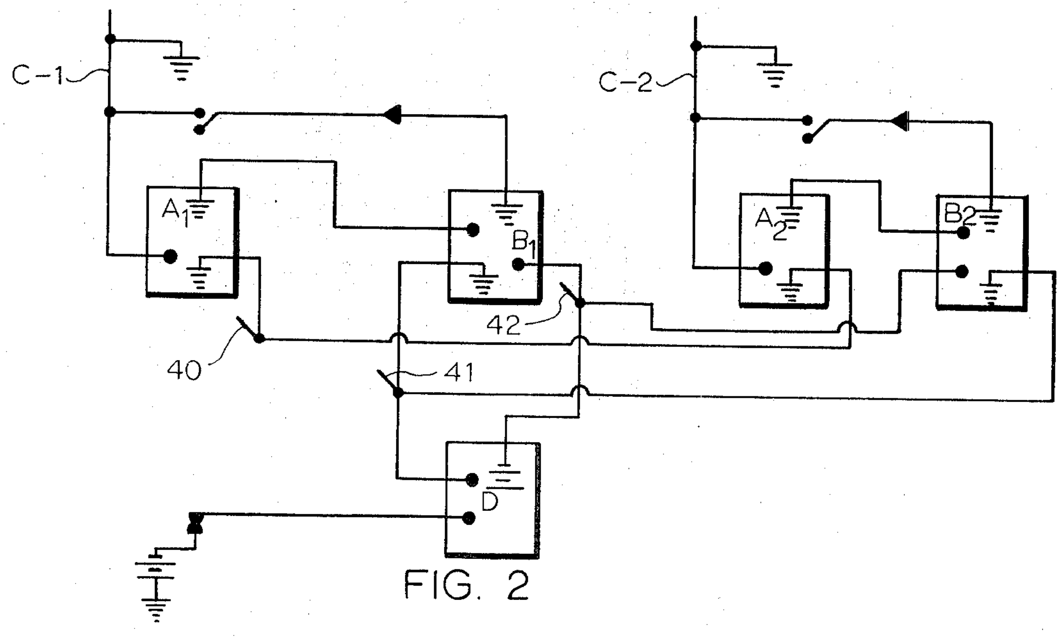
FIG. 2 is a schematic block diagram of the circuit of the invention.

FIG. 2 is a very general schematic diagram and which is shown to quickly introduce to those skilled in the art the basic concepts incorporated in the invention circuitry. In FIG. 2, the letter "C" represents control leads and two such control leads C–1, C–2 are shown by way of example. It should, however, be understood that an auxiliary circuit according to the invention is required for each group of connectors, normally ten in practice. The letter "A" in FIG. 2 is used to represent what is called a "sleeve relay" and the letter "B" is used to designate what is called a "barring relay." $A_1$, $B_1$, and $A_2$, $B_2$ thus represent two sets of such relays. Each control lead requires use of one sleeve relay and one barring relay in the embodiment being described as an example of the invention. Each group of control leads, normally ten, also requires use of an additional relay "D" designated a "holding relay". Each relay "A," as previously mentioned, is preferably a slow-to-release (SR) type and each relay "D" is preferably a slow-to-open (SO) type.

To generally explain the operation illustrated by FIG. 2, it may be noted that the particular "C" lead, when seized, operates the respective "A" relay and the "A" relay in turn supplies a ground to operate the "B" relay. The "B" relay, in a non-operating condition, supplies a ground to operate the "D" relay. In an operating condition, the "B" relay removes one of the multiple grounds (shown at 41) which are supplied by all of the "B" relays. When the last "B" relay operates, and only when the last "B" relay operates, the "D" relay must and does release. When the "D" relay releases, this causes all of the "B" relays which are not at that time being held by "A" relays to be released and, thus, the invention circuitry is restored to its starting condition. As those in the telephone industry will recognize, numbers 40, 41, 42 indicate multiple grounds or leads and infer that they are multiple to all other similar leads in the other units. However, this is not to imply that they are multiple with each other. From this very general explanation, it can be very quickly seen that irrespective of how the DTA might be wired for a first choice connector the invention circuitry will prevent any connectors, once used from being used again until all of the connectors in that group have each been used.

Figure 3:
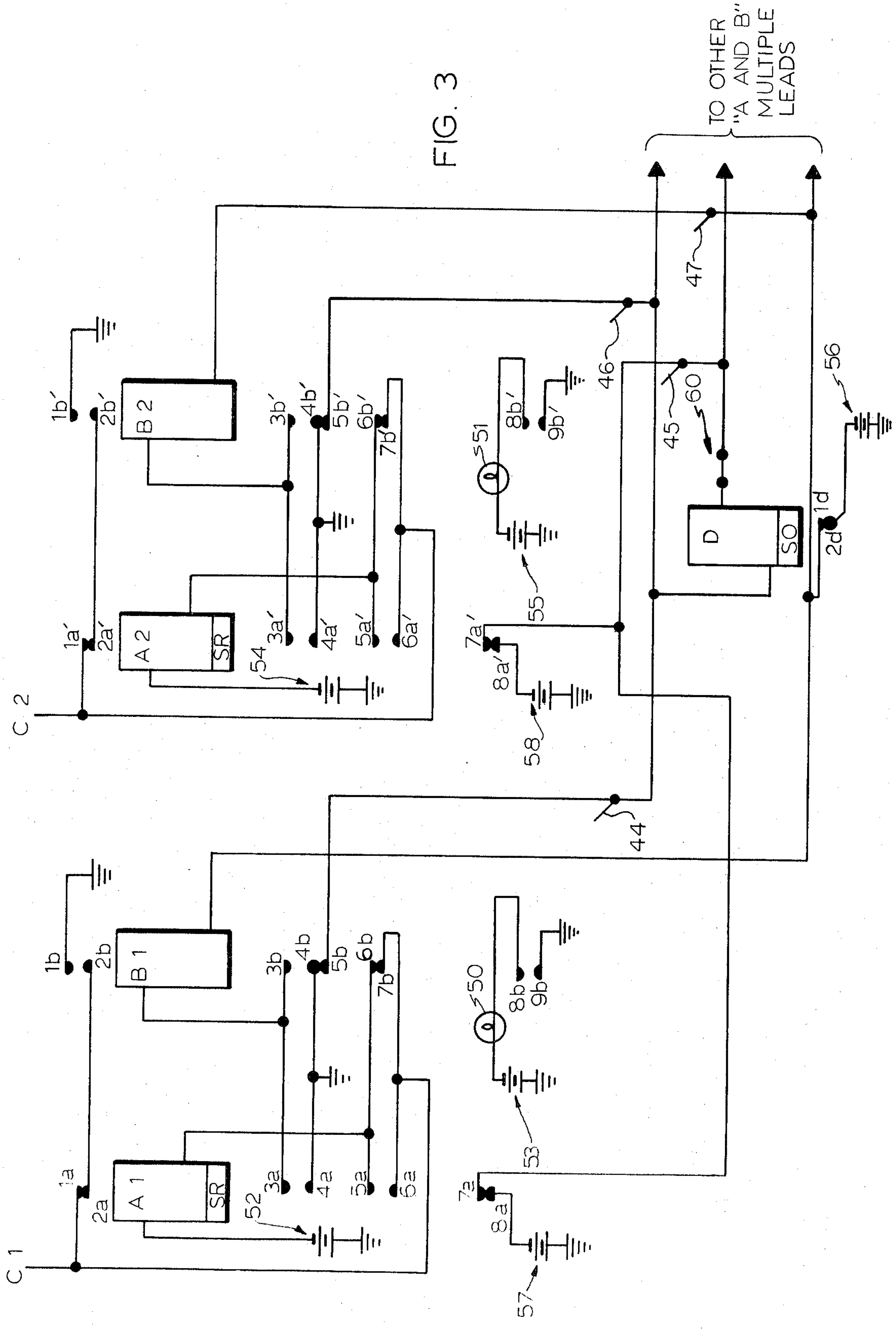
FIG. 3 is a detailed circuit diagram for the invention circuit as used with two control leads from two connectors in a group, it being understood that the type circuitry illustrated repeats for a greater number of connectors in the group except that the holding relay and the mentioned sleeve relay premature operation contacts are common for the group.

In FIG. 3 a more detailed diagram is illustrated and the letter terminology used in FIG. 2 is also used in FIG. 3. In particular, it will be noted that each "A" relay operates the following set of contacts: $1_a$–$2_a$, normally closed; $3_a$–$4_a$, normally open; $5_a$–$6_a$, normally open; $7_a$–$8_a$, normally closed. Each "B" relay operates the following contacts: $1_b$–$2_b$, normally open; $3_b$–$4_b$, normally open; $4_b$–$5_b$, normally closed; $6_b$–$7_b$, normally closed; $8_b$–$9_b$, normally open. A prime notation is used in FIG. 3 to distinguish the A–1, B–1 relay contacts from the A–2, B–2 relay contacts, but it will be seen that the A–2, B–2 contacts are like those described for the A–1, B–1 relays. Relay "D" operates contacts $1_d$–$2_d$, normally closed. Signal lamps 50, 51 are provided as shown and conventional 48-volt battery supplies are provided at 52, 53, 54, 55, 56, 57, and 58 as indicated in FIG. 3. A normally closed, so-called "kill" switch is provided at 60. Numbers 44, 45, 46, and 47 indicate, in FIG. 3, multiple grounds or leads which, as in the leads of FIG. 2, infer that they are multiple to all other similar leads in the other units but are not meant to imply that they are multiple with each other.

In operation, a ground from the preceding selector, e.g., selector 20, is forwarded over the respective "C" lead, e.g., C–1, through respective contacts $6_b$ and $7_b$ of relay B–1 to operate relay A–1. Relay A–1 now operates and forwards a ground to operate relay B–1 through contacts $3_a$ and $4_a$ of relay A–1. When relay A–1 operates, its contacts $1_a$ and $2_a$ are opened which prevents ground from reaching the C–1 lead when relay B–1 operates. Relay A–1 also closes contacts $5_a$ and $6_a$ which provides a holding path for relay A–1 when relay B–1 operates and opens contacts $6_b$ and $7_b$. Relay A–1 also opens contacts $7_a$ and $8_a$ thus removing a multiple battery from relay "D." Relay "D" will, however, not release unless all the "A" relays are operated at the same time.

Relay B–1 operates through contacts $3_a$ and $4_a$ of relay A–1. Relay B–1 closes its contacts $1_b$ and $2_b$ forwarding a ground to the open contacts $1_a$ and $2_a$ of relay A–1. Relay B–1 also opens contacts $4_b$ and $5_b$ which removes a multiple ground path to relay "D." Relay "D" does not release, however, until all "B" relays have operated. Relay B–1 closes contacts $3_b$ and $4_b$ providing a locking path for itself after the release of relay A–1. Relay B–1 also opens contacts $6_b$ and $7_b$ which prevents the ground being forwarded over the C–1 lead when relay A–1 releases to reoperate A–1. This ground over the C–1 lead indicates busy to the preceding selector. Relay B–1 closes contacts $8_b$ and $9_b$ to the busy indicator light 50. Upon the removal of ground from the C–1 lead by the release of the preceding selector, relay A–1 releases. Relay B–1 remains operated, however, through its locking path and will remain operated until the battery path from battery 56 to relay B–1 is removed by the release of relay "D." Relay "D" is a normally slow-to-open operated relay and is held operated by the multiple grounds forwarded through "4" and "5" contacts, i.e., $4_b$, $5_b$, $4_b'$, $5_b'$, of the "B," i.e., B–1, B–2, relays. Relay "D" releases when ground is removed from its operating path by the operation of the last "B" relay. Relay "D" also releases when all of the "A" relays are operated and all multiple batteries have been removed from its operating path. When relay "D" releases and opens contacts $1_d$ and $2_d$, this removes battery 56 from the operating path of all the "B" relays causing them to release and reset the connector usage equalizer to again accept incoming calls.

In summary, it can be seen that the invention circuitry requires no modification of existing telephone equipment and yet provides a continuous connector wear equalization function which has not heretofore been achieved. The concept of establishing a substitute barring potential for each connector, once used, until all connectors in the group have been used can also be seen to provide a simple, economical, and practical solution to the problem.

What is claimed is:

1. In a telephone switching system having a main switching system to selectively connect telephone handsets, such main system including a plurality of "connectors" each having a control lead, plural groups of handsets connected to each connector, a distribution terminal assembly, and "fifth selectors" connected through said distribution terminal assembly to said connectors in a predetermined first choice wiring array, in combination therewith, an auxiliary control system for equalizing wear on the connectors, said auxiliary system having a switching network, permanent connections from each connector control lead to said network and auxiliary switching means within said network responsive to the seizure of said control leads, said auxiliary switching means being connected within said network to said control leads and having a potential source and means to connect said potential source to respective said control leads whereby as each control lead for each connector in each connector group is seized, used and released in a normal manner, a substitute barring potential is placed thereon and such barring potentials are maintained for all such seized control leads after the same become seized, used and released in the normal manner, and further having means to disconnect said potential source from said control leads and thereby disconnect said barring potentials from all said control leads associated with the connector group but only after all the control leads have been so seized, used and released whereby to insure that no connector in the group is seized, used and released again until all connectors in the group have been so utilized.

2. In a telephone switching system as claimed in claim 1 wherein said means to connect and disconnect said potential source to and from said control leads comprises first relay means including a pair of interconnected relays for each control lead, termed a sleeve and a barring relay, and a second control relay means for each group of connectors served by said auxiliary control system, each said sleeve relay being connected to be energized when its respective associated control lead is seized and to be released after the connector associated with such control lead has been used and released in the normal manner, said barring relay being connected to provide a barring ground potential to the respective said control lead after such control lead has been used and released and said second control relay means being connected to de-energize all of said barring relays in the respective said group but only after all the control leads in said group have been seized, used and released in the normal manner.

* * * * *